United States Patent [19]
Snyder

[11] Patent Number: 6,073,215
[45] Date of Patent: Jun. 6, 2000

[54] DATA PROCESSING SYSTEM HAVING A DATA PREFETCH MECHANISM AND METHOD THEREFOR

[75] Inventor: Michael Dean Snyder, Austin, Tex.

[73] Assignee: Motorola, Inc., Schaumburg, Ill.

[21] Appl. No.: 09/127,884

[22] Filed: Aug. 3, 1998

[51] Int. Cl.$^7$ ...................................................... G06F 12/08
[52] U.S. Cl. ............................................ 711/137; 711/213
[58] Field of Search ..................................... 711/118, 137, 711/217, 218, 219, 220, 213

[56] References Cited

U.S. PATENT DOCUMENTS 5,206,822 4/1993 Taylor .
5,694,568 12/1997 Harrison, III et al. .

OTHER PUBLICATIONS

Milligan et al., "Processor Implementation Using Queues", 1995, P 58–66, IEEE Micro.

*Primary Examiner*—Eddie P. Chan
*Assistant Examiner*—Kevin L. Ellis
*Attorney, Agent, or Firm*—Daniel D. Hill; Sandra L. Godsey

[57] ABSTRACT

A data processing system (10) includes a mechanism for preventing DST line fetches from occupying the last available entries in a cache miss queue (50) of the data cache and MMU (16). This is done by setting a threshold value of available cache miss queue (50) buffers over which a DST access is not allowed. This prevents the cache miss queue (50) from filling up and preventing normal load and store accesses from using the cache miss queue (50).

11 Claims, 5 Drawing Sheets

DATA PROCESSING SYSTEM HAVING A DATA PREFETCH MECHANISM AND METHOD THEREFOR

CROSS REFERENCE TO RELATED APPLICATIONS

A related application entitled "Data Processing System For Processing Vector Data And Method Therefor", by Hunter L. Scales et al., and having Ser. No. 09/061,975, was filed on Apr. 17, 1998, and assigned to the assignee hereof.

A related application entitled "Mechanism For Sharing Data Cache Resources Between Data Prefetch Operations And Normal Load/Store Operations in a Data Processing System", by Michael Snyder et al., and having Attorney Docket Number SC90935A, was filed concurrently herewith, and assigned to the assignee hereof.

FIELD OF THE INVENTION

This invention relates generally to data processing systems, and more particularly to data processing systems having a data prefetch mechanism.

BACKGROUND OF THE INVENTION

A known way to increase the performance of a computer system is to include a local, high speed memory known as a cache. A cache increases system performance because there is a high probability that once the central processing unit (CPU) has accessed a data element at a particular address, its next access will be to an adjacent address. The cache fetches and stores data which is located adjacent to the requested piece of data from a slower, main memory or lower-level cache. In very high performance computer systems, several caches may be placed in a hierarchy. The cache which is closest to the CPU, known as the upper-level or "L1" cache, is the highest level cache in the hierarchy and is generally the fastest. Other, generally slower caches are then placed in descending order in the hierarchy starting with the "L2" cache, etc., until the lowest level cache which is connected to main memory. Note that typically the L1 cache is located on the same integrated circuit as the CPU and the L2 cache is located off-chip. However as time passes it is reasonable to expect that lower-level caches will eventually be combined with the CPU on the same chip.

Recently, microprocessors designed for desktop applications such as personal computers (PCs) have been modified to increase processing efficiency for multimedia applications. For example, a video program may be stored in a compression format known as the Motion Picture Experts Group MPEG-2 format. When processing the MPEG-2 data, the microprocessor must create frames of decompressed data quickly enough for display on the PC screen in real time. However, the latency in fetching data for the L2 cache may be as many as 100 to 150 processor clock cycles.

Even with aggressive out-of-order processor microarchitectures, it is difficult for the processor to make forward progress and program execution when waiting for data from long latency memories when cache miss rates are significant.

To help hide this long main memory latency many instruction set architectures have added instructions which serve only to prefetch data from memory into the processor's cache hierarchy. If software can predict far enough in advance the memory locations which the program will subsequently use, these instructions can be used to effectively hide the cache miss latency. This can be done because the software directed prefetch mechanism only uses resources which serve cache misses and do not tie up other valuable resources such as completion buffer entries and register renames.

One way of providing software prefetching has been classified as synchronous software directed prefetching. The prefetching is synchronous because the prefetch hint usually specifies a small amount of memory and can be executed in program order like any other load instruction. In architectures such as the PowerPC architecture, available from Motorola, Inc. of Austin Tex., instructions called data cache block touch and data cache block touch for store are examples of synchronous software prefetch instructions.

Another instruction class of prefetch instructions is called data stream touch (DST). DST instructions are classified as asynchronous because the instructions can specify a very large amount of memory to be prefetched in increments of cache blocks by a DST controller. The DST controller runs independently of normal load and store instructions. That is, the controller runs in the background while the processor continues normally with the execution of other instructions. DST instructions are useful where memory accesses are predictable and can be used to speed up many applications, such as for example, multimedia applications.

However, the DST mechanism still requires resources for processing cache misses. These resources are also used for normal load store operations. Examples of these missed resources are cache reload queue entries or miss queue entries. If the DST engine saturates the miss resources such as the cache miss queue, the forward progress of normal loads and stores will be stopped because of full buffer conditions.

DETAILED DESCRIPTION OF A PREFERRED EMBODIMENT

Generally, the present invention provides a mechanism for preventing DST line fetches from occupying the last available entries in the cache miss queue of the data cache and MMU. This is done by setting a threshold value of available cache miss queue buffers over which a DST access is not allowed. This prevents the cache miss queue from filling up and preventing normal load store accesses from using cache miss queue 50.

Figure 1:
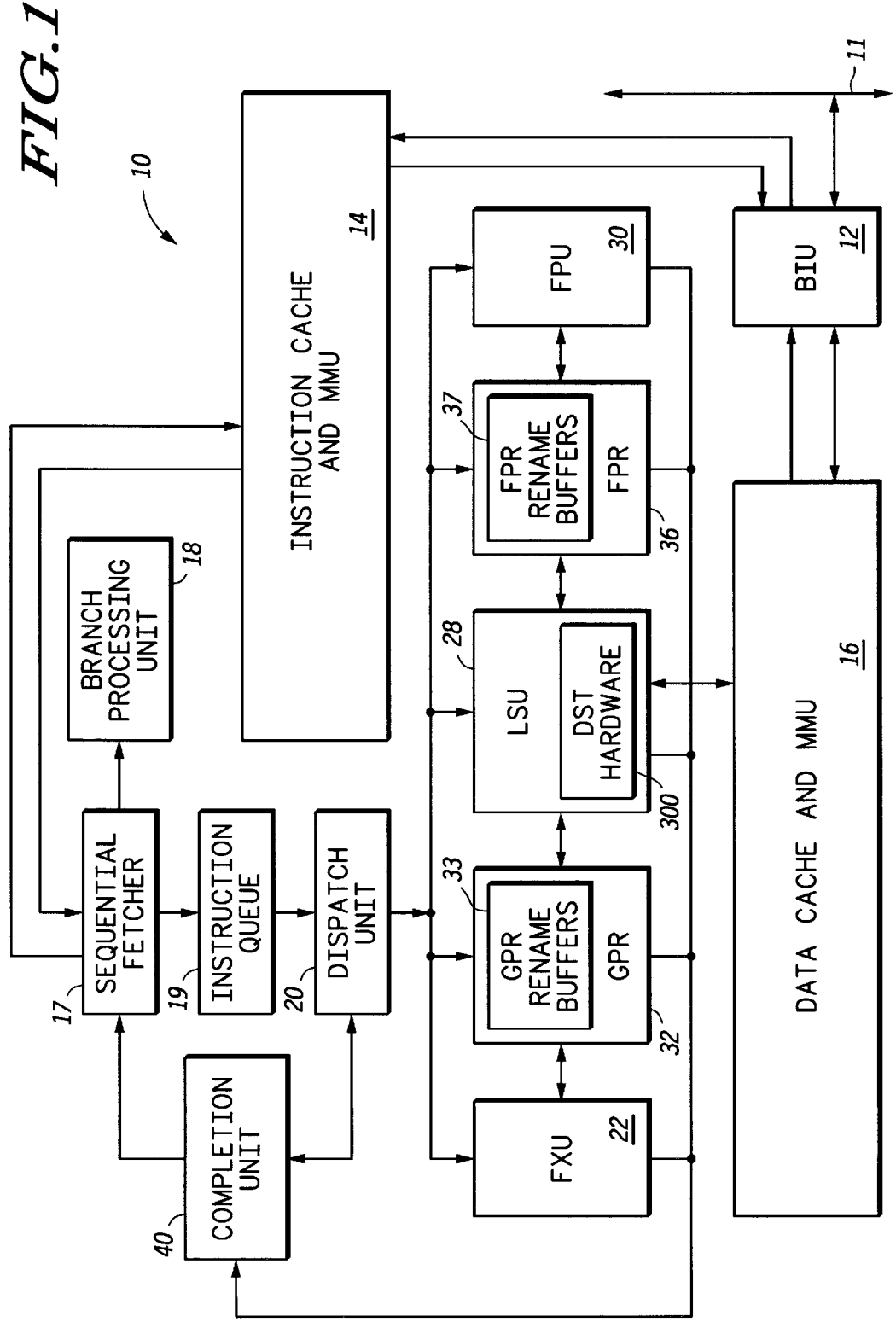
FIG. 1 illustrates, in block diagram form, a data processor in accordance with the present invention.

With reference now to the figures, and in particular with reference to FIG. 1, there is illustrated a block diagram of a data processor, indicated generally as data processor 10, for processing information according to a preferred embodiment of the present invention. In the depicted embodiment, data processor 10 comprises a single integrated circuit superscalar microprocessor capable of executing multiple instructions per processor cycle. Accordingly, as discussed further below, data processor 10 includes various execution units, registers, buffers, memories, and other functional units, which are all formed by integrated circuitry. In a preferred embodiment of the present invention, data processor 10 comprises one of the PowerPC™ line of microprocessors produced by Motorola, Inc., which operates according to reduced instruction set computing (RISC) techniques.

As depicted in FIG. 1, data processor 10 forms a central processing unit (CPU) of a data processing system and is coupled to system bus 11 via a bus interface unit (BIU) 12 within data processor 10. BIU 12 controls the transfer of information between data processor 10 and other devices coupled to system bus 11, such as a main memory (not illustrated). Data processor 10, system bus 11, and the other devices coupled to system bus 11 together form a host data processing system. BIU 12 is connected to instruction cache 14 and data cache 16 within data processor 10. High speed caches, such as instruction cache 14 and data cache 16, enable data processor 10 to achieve relatively fast access time to a subset of data or instructions previously transferred from main memory to the high speed caches, thus improving the speed of operation of the host data processing system. Instruction cache 14 is further coupled to sequential fetcher 17, which fetches instructions from instruction cache 14 for execution.

Sequential fetcher 17 transfers branch instructions to branch processing unit (BPU) 18 for execution, and transfers sequential instructions to instruction queue 19 for temporary storage before being executed by other execution circuitry within data processor 10. BPU 18 executes branch instructions, which change the sequence in which the instructions in the computer program are performed, and performs static and dynamic branch prediction on unresolved conditional branches to allow speculative instructions to be fetched and executed. Instructions issued beyond a predicted branch do not complete execution until the branch is resolved, preserving the programming model of sequential execution. Sequential instructions are transferred from instruction queue 19 to dispatch unit 20 to be dispatched to their respective execution units, the dispatch rate being contingent upon execution unit busy status, rename and completion buffer availability, and the serializing behavior of some instructions. Dispatch unit 20 performs source and destination register dependency checking and renaming on instructions dispatched in parallel or out-of-order. Completion unit 40 tracks instructions from dispatch through execution, and then retires, or "completes" them in program order. Completing an instruction commits the process to any architectural register changes caused by that instruction. In-order completion ensures the correct architectural state when the microprocessor must recover from a mispredicted branch or any exception.

In the depicted embodiment, in addition to BPU 18, the execution circuitry of data processor 10 comprises multiple execution units, including fixed-point unit (FXU) 22, load/store unit (LSU) 28, and floating-point unit (FPU) 30. These execution units can execute instructions simultaneously during a single processor cycle. Each of execution units 18, 22, 28, and 30 can execute one or more instructions within a particular class of instructions. For example, FXU 22 performs fixed-point mathematical operations such as addition, subtraction, ANDing, ORing, and XORing, utilizing source operands received from specified general purpose registers (GPRs) 32 or GPR rename buffers 33. Following the execution of a fixed-point instruction, FXU 22 outputs the data results of the instruction to GPR rename buffers 33, which provide temporary storage for the result data until the instruction is completed by transferring the result data from GPR rename buffers 33 to one or more of GPRs 32. FPU 30 performs floating-point operations, such as floating-point multiplication and division, on source operands received from floating-point registers (FPRs) 36 and FPR rename buffers 37. FPU 30 outputs data resulting from the execution of floating-point instructions to selected FPR rename buffers 37, which temporarily store the result data until the instructions are completed by transferring the result data from FPR rename buffers 37 to selected FPRs 36. LSU 28 executes floating-point and fixed-point instructions that either load data from memory (i.e., either data cache 16 or main memory) into selected GPRs 32, FPRs 36, or that store data from a selected one of GPRs 32, GPR rename buffers 33, FPRs 36, FPR rename buffers 37, or VPR rename buffers 26 to memory. In accordance with the present invention, LSU 28 also includes data stream touch load (DST) hardware 300 which will be described more fully below.

Data processor 10 employs both pipelining and out-of-order execution of instructions to further improve the performance of its superscalar architecture. Accordingly, instructions can be executed by FXU 22, LSU 28, and FPU 30 in any order as long as data dependencies are observed. In addition, instructions are processed by each of FXU 22, LSU 28, and FPU 30 at a sequence of pipeline stages. As is typical of high-performance processors, each instruction is processed at five distinct pipeline stages, namely, fetch, decode/dispatch, execute, finish, and completion.

During the fetch stage, sequential fetcher 17 retrieves one or more instructions associated with one or more memory addresses from instruction cache 14. Sequential instructions fetched from instruction cache 14 are stored by sequential fetcher 17 within instruction queue 19. Fetched branch instructions are removed from the instruction stream and are forwarded to BPU 18 for execution. BPU 18 includes a branch prediction mechanism, such as a branch history table, that enables BPU 18 to speculatively execute unresolved conditional branch instructions by predicting whether the branch will be taken.

During the decode/dispatch stage, dispatch unit 20 decodes and dispatches one or more instructions from instruction queue 19 to the appropriate ones of execution units 22, 28, and 30. Also during the decode/dispatch stage, dispatch unit 20 allocates a rename buffer within GPR rename buffers 33 or FPR rename buffers 37 for each dispatched instruction's result data. According to a preferred embodiment of the present invention, data processor 10 dispatches instructions in program order and tracks the program order of the dispatched instructions during out-of-order execution utilizing unique instruction identifiers. In addition to an instruction identifier, each instruction within the execution pipeline of data processor 10 has an rA tag and a rB tag and/or a rC tag, which indicate the sources of the A and B operands for the instruction, and a rD tag that indicates a destination rename buffer within GPR rename buffers 33 or FPR rename buffers 37 for the result data of the instruction.

During the execute stage, execution units 22, 28, and 30, execute instructions received from dispatch unit 20 opportunistically as operands and execution resources for the indicated operations are available. After execution has finished, execution units 22, 28, and 30 store result data within either GPR rename buffers 33 or FPR rename buffers 37, depending upon the instruction type. Then, execution units 22, 28, and 30 notify completion unit 40 which instructions have finished execution. Finally, instructions are completed by completion unit 40 in program order by transferring result data from GPR rename buffers 33 and FPR rename buffers 37 to GPRs 32 and FPRs 36, respectively.

Figure 2:
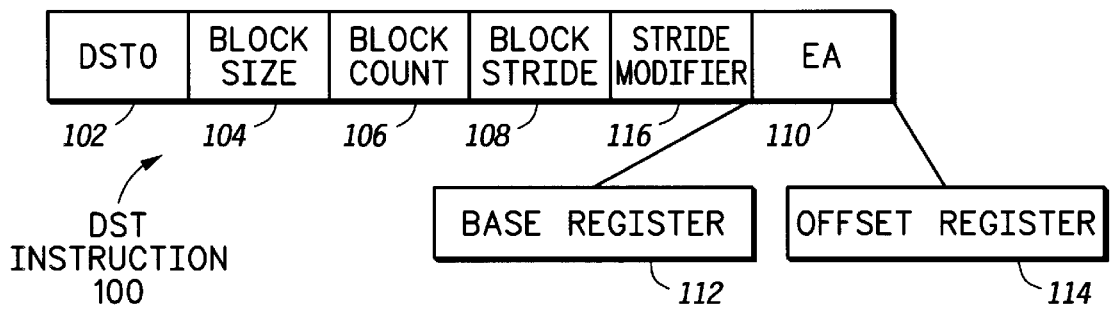
FIG. 2 illustrates, in block diagram form, an encoding of the data stream touch load instruction used by the data processor of FIG. 1.

With reference now to FIG. 2, there is shown a graphical representation of the fields of a data stream touch load instruction, in accordance with one embodiment of the present invention. The data stream touch load (DST) instruction is used to asynchrouously prefetch a stream of bytes from lower levels of the memory hierarchy and causes them to be loaded into the non-architected, higher, faster levels of memory prior to issuance of a load instruction requesting that data stream. As used herein, "non-architected" means not present in the programmer's model. For example, the DST instruction could preload a frame of video data from the system memory into the data cache prior to a load instruction requesting that frame and while the processor is processing a previous frame. Thus, it can be seen that the DST instruction is designed to allow preloading of data from a lower level of memory into a higher level while processor execution is allowed to continue, improving processor speed and efficiency.

As illustrated in FIG. 2, DST instruction 100 includes a plurality of fields, including an op code 102 labeled "DST0", a BLOCK SIZE 104, a BLOCK COUNT 106, a BLOCK STRIDE 108, a STRIDE MODIFIER 116, and an effective address field (EA) 110. In an alternative embodiment of the present invention, a general-purpose register holds the field data for the BLOCK SIZE, BLOCK COUNT, and BLOCK STRIDE and the DST instruction points to that register. Op code 102 indicates that the instruction is a DST instruction prefetching a data stream or vector from memory. As defined herein, a vector is "prefetched" when it is brought from a lower level of the memory hierarchy into a higher level of the memory hierarchy. BLOCK SIZE 104 indicates the number of vector bytes to be retrieved per block for each memory block of the data stream being retrieved from memory. In one embodiment, a vector byte is a 16-bit value. In general, the block size is of arbitrary length and LSU 28 will initiate multiple fetches if the block size exceeds the line size of data cache 16. BLOCK COUNT 106 indicates how many blocks, each of a size equal to BLOCK SIZE 104, will make up the data stream prefetched by this instruction. BLOCK STRIDE 108 indicates the address offset between each block of the data stream. STRIDE MODIFIER 116 indicates a value by which the block stride can be algebraically modified for each block of the block count for this instruction. In one embodiment, BLOCK SIZE 104 is a five-bit field, allowing from 1 to 32 blocks of vector bytes, BLOCK COUNT 106 is an eight-bit field allowing 1 to 256 blocks to be fetched, and BLOCK STRIDE 108 is a signed 16-bit field allowing ±32,768 bytes of stride.

EA 110 designates two registers, a base register 112 and an offset register 114. The values in these two registers are added together to provide the effective address of the first element of the vector being prefetched from memory. In an alternative embodiment, DST instruction 100 contains register fields replacing fields 104, 106, and 108 that designate registers containing the block size, block count, and block stride control information. This alternative embodiment allows the definition of the data stream prefetch to be calculated dynamically during processor execution by accessing this control information.

As one example of the use of the DST instruction, a 2-dimensional data vector in memory may have some number of rows, each row having a single-dimension vector and residing in sequential memory locations. If the data vector being retrieved from memory is contained in sequential locations in the memory (assuming each element in the vector has an element number index), the vector which is formed by the elements in each row which have the same row index is called a column vector. Thus, for example, to fetch the elements of the column vector, the first element would be prefetched from the effective address indicated by EA 110. Then the block stride would be repetitively added to the previous effective address to form the address of each subsequent element of the column vector. The rows of a vector are prefetched by setting the stride equal to one. The columns of a vector are prefetched by setting the stride equal to the length of the row; for DST instruction 100, BLOCK STRIDE 108 would be made equal to the value of BLOCK SIZE 104 because the block stride would be equal to the length of each row of the two-dimensional vector.

Moreover, it will be appreciated by those skilled in the art that the DST instruction can be used to fetch elements of one, two, or higher-dimension vectors. Since a three-dimensional vector may be defined as an array of two-dimensional vectors that each may be called a "page", particular pages within the vector may be accessed by setting the stride value equal to the product of the length of the row and the column of each page or some integer multiple thereof. It will be appreciated that, in general, a vector of any order or number of dimensions may be accessed by the index of its highest order element by setting the stride equal to the product of the length of all the lower order elements.

Diagonal vectors within the vector array can be accessed by utilizing an additional field in the DST instruction that modifies the block stride as each block is accessed in memory. As shown in FIG. 2, STRIDE MODIFIER 116 includes a value by which the block stride is incremented, decremented, or multiplied for each block prefetched to memory.

Also in one embodiment of the present invention, prefetching of multiple data streams can be implemented by executing multiple DST instructions. Each data stream is named by encoding the stream name into the DST instruction itself in op code 102, such as DST0 illustrated in FIG. 2. There would be a separate version of a DST instruction for each separate stream. Thus, for example, a vector function of two operands will, in general, need two data streams to be prefetched simultaneously. The DST instruction may encode any number of streams to be prefetched, but the finite resources available to implement the instruction would limit the number of DST instructions to a reasonably small number, such as four. Hardware or software can further be used to multiplex the actual streaming hardware to make it appear that a larger number of streams were available.

Figure 3:
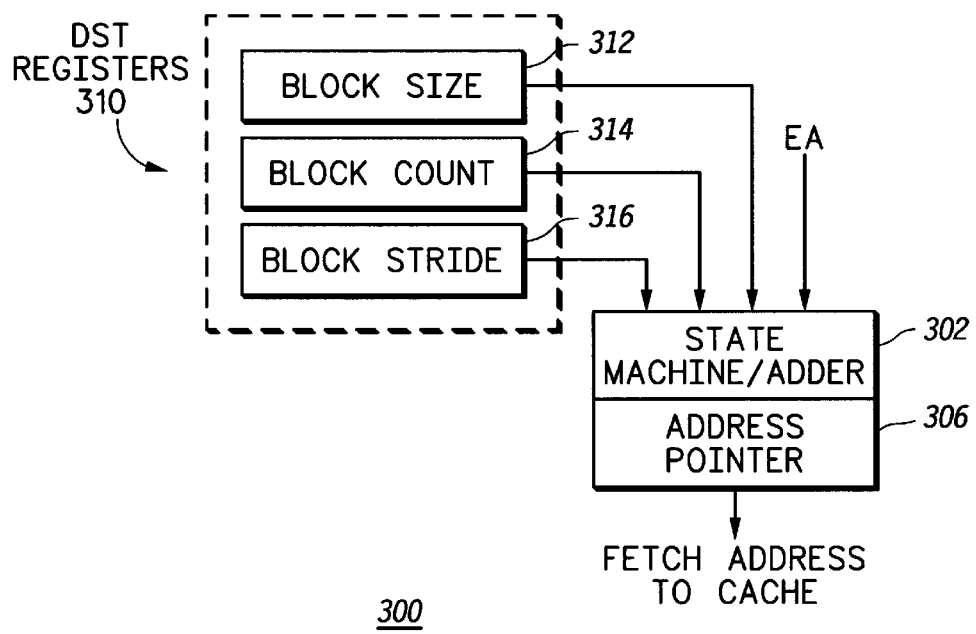
FIG. 3 illustrates, in block diagram form, one of the data stream touch load circuits of FIG. 1.

With reference to FIG. 3, there is shown DST hardware 300 contained within LSU 28 to assist it in executing a DST instruction in accordance with one embodiment of the present invention. DST registers 310 are loaded with the corresponding block size, block count, and block stride values when the particular DST instruction is executed. For example when used to execute DST instruction 100, BLOCK SIZE 104 is stored in register 312, BLOCK COUNT 106 is stored in register 314, and BLOCK STRIDE 108 is loaded into register 316. State machine/adder 302 receives both the effective address indicated by EA 110 and the contents of DST registers 310. An address pointer register 306 in state machine/adder 302 is initially loaded with the effective address indicated by EA 110. State machine/adder 302 then performs a prefetch of the block addressed at the effective address indicated by EA 110 and having a block size equal to the BLOCK SIZE value in register 312. As will be appreciated, state machine/adder 302 may perform multiple fetches to prefetch the required number of vector bytes equal to the BLOCK SIZE. State machine/adder 302 then adds the BLOCK STRIDE value contained in register 316 to the effective address and stores the sum as the new effective address in address pointer register 306, decrements the BLOCK COUNT contained in register 314, and prefetches the next block from memory by issuing a fetch address to BIU 12 for the next block in the data stream, if the BLOCK COUNT has not been decremented to zero. State machine/adder 302 continues this process of incrementing the effective address by the BLOCK STRIDE, decrementing the BLOCK COUNT, and issuing a fetch address to the cache for the next block of the data stream until the BLOCK COUNT value contained in register 314 has been decremented to zero. At that point, the desired vector has been prefetched into a higher level of the memory hierarchy. As will be appreciated, DST hardware 300 may be duplicated for each data stream prefetch supported by data processor 10, but only DST registers 310 need be duplicated by sharing the remainder of DST hardware 300 between different DST instructions.

The architectural state of the DST instruction is that it is issued, executed, and completed at the same time, even though the DST hardware may continue to implement the DST instruction by proceeding with prefetching the desired data stream into the higher-level memory. Therefore, there may be cases in which it is desirable to stop the prefetch of a particular data stream after the issuance of a DST instruction. In a preferred embodiment, a "DST stop" instruction is provided that, when issued, resets DST hardware 300 to stop a data stream prefetch currently being performed. In addition, certain coding may be structured such that data prefetch of a particular data stream may get ahead of the execution of other code. To keep the executing DST instructions synchronized with the corresponding vector load instructions, a DST instruction is designed, in a preferred embodiment, such that a DST instruction when executed will immediately supersede a previously executed but unfinished DST instruction for the same particular data stream (such as DST0). To step the prefetch back, address pointer register 306 would be modified by subtracting an offset equal to a predetermined number of BLOCK STRIDEs multiplied by the vector BLOCK SIZE (as indicted in register 312), and the BLOCK COUNT in register 314 would also be decremented by the predetermined number.

While the present invention has been described in the context of a data stream prefetch for a load, it will be appreciated that the present invention is also applicable to a prefetch for a data stream store operation. In the illustrated embodiment, data processor 10 is also capable of executing an instruction called a data stream touch for store (DSTST). Data processor 10 executes the DSTST instruction in the same manner as the DST instruction except that it additionally marks the data within the cache as data that will be modified or written by changing its cache state. For example data cache 16 implements the modified, exclusive, shared, invalid (MESI) protocol and data processor 10 marks the prefetched block as data that will be written by placing the cache line or lines corresponding to the prefetched block into the exclusive state in cache 16.

Figure 4:
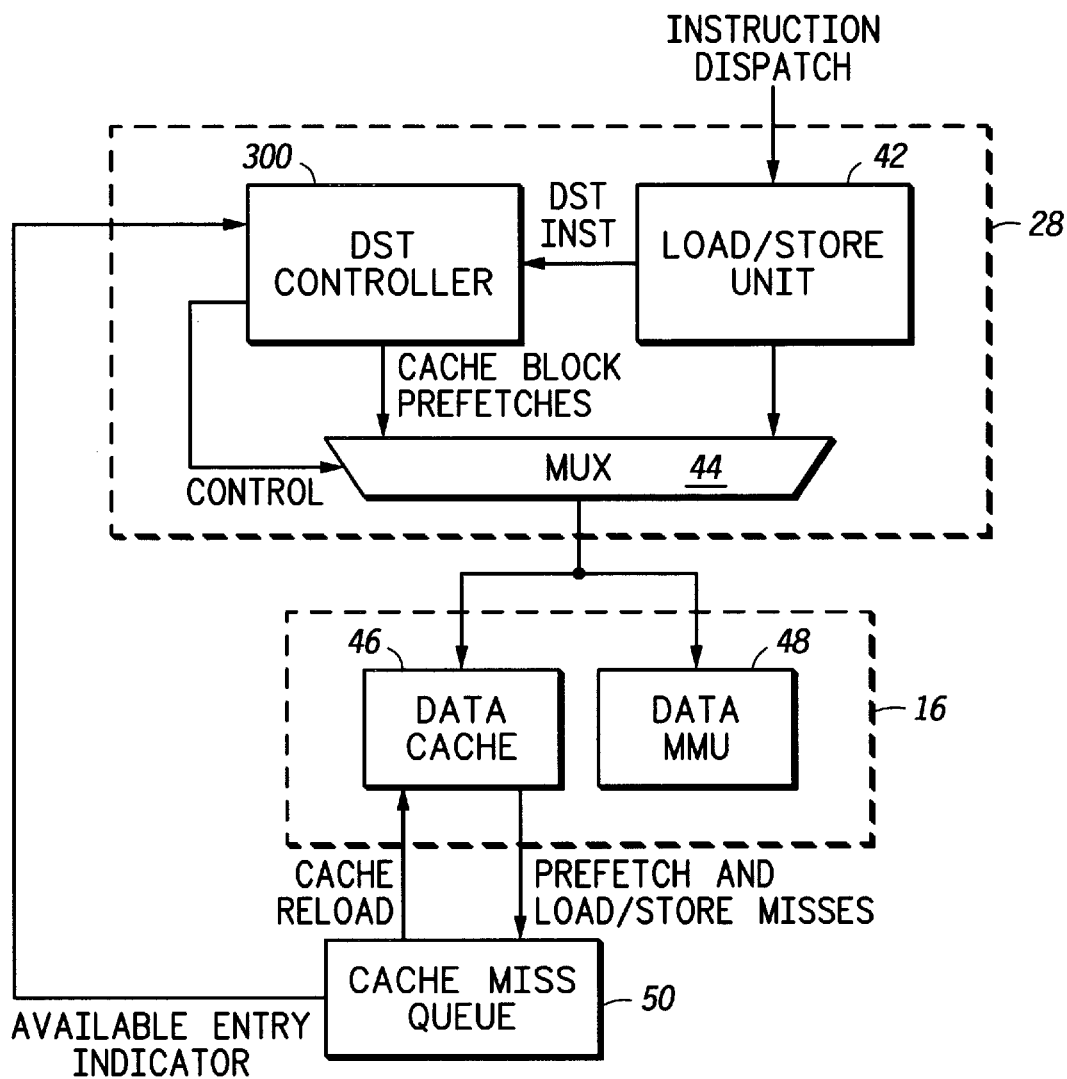
FIG. 4 illustrates, in block diagram form, a portion of the data processor of FIG. 1 in more detail.

FIG. 4 illustrates, in block diagram form, a portion of data processor 10 of FIG. 1. In FIG. 4, LSU 28 includes DST controller 300, load/store unit 42 and multiplexer 44. Data cache and MMU 16 includes a data cache 46 and a data MMU 48. Also shown in FIG. 4 is cache miss queue 50.

Load/store unit 42 has a plurality of input terminals for receiving instructions labeled "INSTRUCTION DISPATCH", and a plurality of output terminals for providing an instruction labeled "DST INST" to DST controller 300. Multiplexer 44 has a first plurality of input terminals for receiving signals labeled "CACHE BLOCK PREFETCHES" from DST controller 300, a second plurality of input terminals coupled to load/store unit 44, and a plurality of output terminals. Also, DST controller 300 has an output terminal for providing a control signal labeled "CONTROL" to a control terminal of multiplexer 44.

Data cache 46 has a plurality of input terminals coupled to the out terminals of multiplexer 44 and a plurality of output terminals for providing prefetch and load/store misses to cache miss queue 50. Data MMU 48 has a plurality of input terminals coupled to the output terminals of multiplexer 44. Data MMU 48 functions as a data flow controller for data cache 46. Cache miss queue 50 also includes a plurality of output terminals for providing signals labeled "CACHE RELOAD" to input terminals of data cache 46, and a plurality of input terminals for receiving signals labeled "PREFETCH AND LOAD/STORE MISSES". Cache miss queue 50 also has an output terminal coupled to an input terminal of DST controller 300 for providing a signal labeled "AVAILABLE ENTRY INDICATOR".

In operation, multiplexer 44 is used to control when DST controller 300 and load/store unit 42 have access to data cache and MMU 16. Load/store unit 42 receives instructions from dispatch unit 20, illustrated in FIG. 1. Dispatch unit 20 provides the DST instruction to the instruction execution unit, and in response, the instruction execution unit provides DST instruction to DST controller 300. A multi-level priority scheme is used to control when DST controller 300 has access to the data cache and MMU 16. The priority scheme has two parts. First, the DST controller 300 is always selected if load/store unit 42 has no valid instructions to execute. Also, the DST controller 300 is selected if load/store unit 42 has a valid instruction but the valid instruction does not yet have all source operands available. This allows any DST prefetch request to the data cache to occur in an opportunistic fashion when the load/store unit 42 would not otherwise be using data cache and MMU 16. Note that a data stream touch instruction is used to deactivate DST controller 300 to stop a data stream prefetch currently being performed.

Secondly, a pace mechanism is used to override any access by load/store unit 42 and allow DST controller 300 access if a DST request is available. The pace mechanism consists of a count down counter (not shown in FIG. 4) along with a counter/reload mechanism which will be described later in connection with FIG. 6.

By using this pacing mechanism to regularly space forward progress of DST controller 300, the DST controller has the ability to effectively prefetch data early enough such that the prefetch mechanism can stay ahead of subsequent loads or stores which actually consume the data. If the data consumer loads and stores catch up with the data stream engine, the engine would lose all of its performance enhancing advantages.

Still referring to FIG. 4, DST controller 300 is prevented from accessing data cache and MMU 16 in order to prevent any DST initiated prefetch from occupying the last N available entries in cache miss queue 50, where N is equal to a predetermined threshold value minus 1. In one embodiment, N equals 2, the threshold value equals 3 and the total number of buffers in cache miss queue 50 is 8.

On each cycle, the number of remaining available buffers in cache miss queue 50 is counted and an AVAILABLE ENTRY INDICATOR is provided to DST controller 300 by cache miss queue 50. If there are no miss buffers available, DST controller 300 is not allowed access to data cache and MMU 16. Also, if the number of miss buffers is less than the threshold value of DST controller 300 is prevented access to data cache and MMU 16. However, if the number of miss buffers in cache miss queue 50 is greater than the threshold value, then DST controller 300 is allowed to make another line fetch request.

By preventing the DST controller 300 from completely filling cache miss queue 50 and thereby saturating the miss resources, the forward progress of normal loads and stores will not be stopped because of a buffer full condition.

Figure 5:
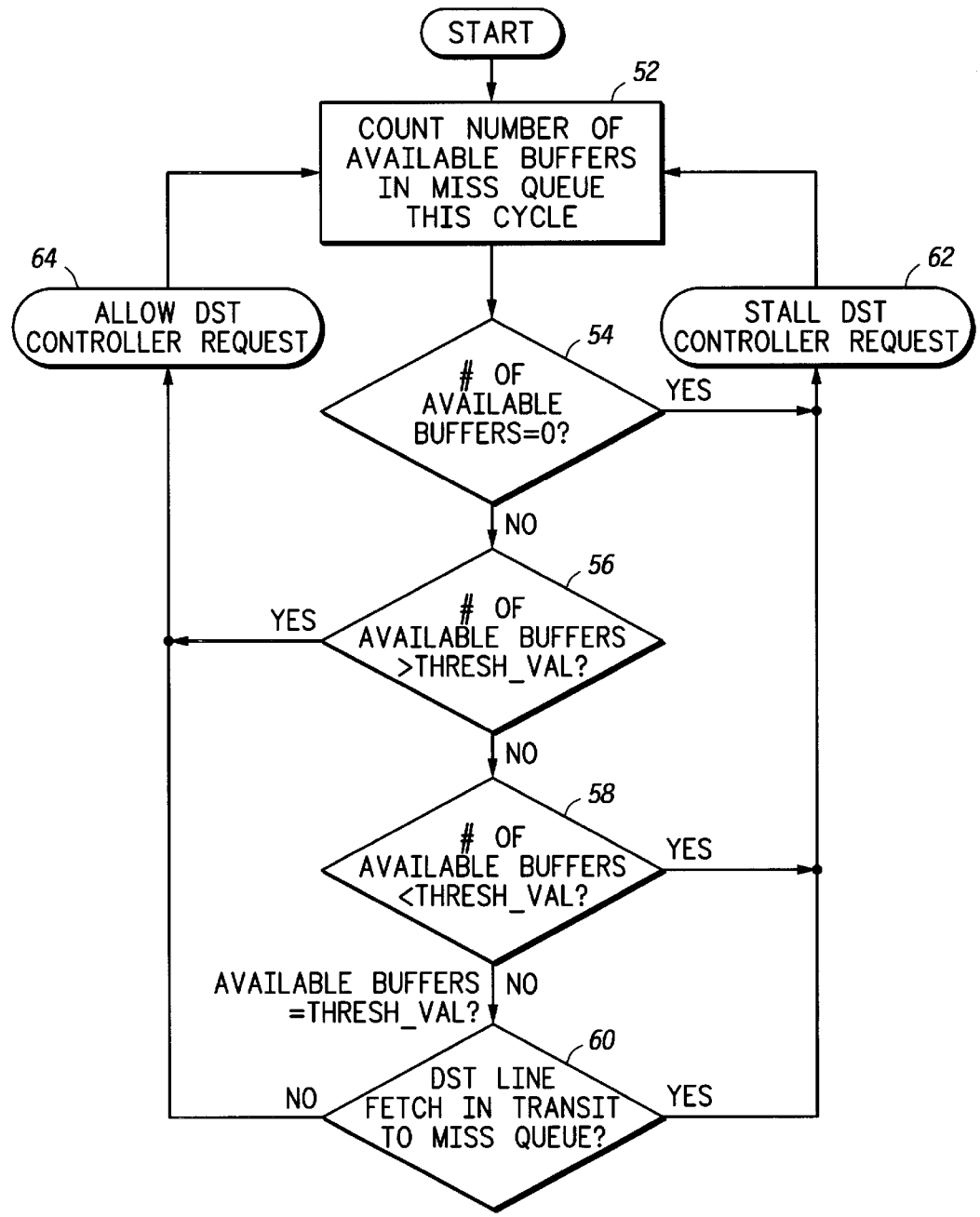
FIG. 5 illustrates a flow chart of a method for controlling the filling of the cache miss queue of FIG. 4.

FIG. 5 illustrates a flow chart of a method for preventing DST controller 300 from causing a full condition in cache miss queue 50. At step 52, the number of available entries in cache miss queue 50 are computed using status information in cache miss queue 50. At step 54, it is determined if the number of available buffers of cache miss queue 50 is equal to zero indicating that miss queue 50 is full. If the number of available buffers is equal to zero, the "YES" path is taken to step 62. At step 62, DST controller 300 is stalled and prevented from accessing data cache and MMU 16. After step 62, program flow resumes at step 52. If, at step 54, the number of available buffers is not equal to zero, the "NO" path is taken to step 56. At decision step 56 it is determined if the number of available buffers is greater than the threshold value. If the number of available buffers is greater than the threshold value, the "YES" path is taken to step 64. At step 64, DST controller 300 is allowed access to data cache and MMU 16. After the access, the method returns to step 52. If, at step 56, the number of available buffers is not greater than the threshold value, the "NO" path is taken to decision step 58. At decision step 58, it is determined if the number of available buffers is less than the threshold value. If yes, program flow continues to step 62 and DST controller 300 is prevented from accessing data cache and MMU 16. If the number of available buffers is not less then the threshold value, then the "NO" path is taken to decision step 60. At decision step 60, it is determined if a DST line fetch is in transit to cache miss queue 50. This determination is made because every access to data cache and MMU 16 may not result in a cache miss entry being made in cache queue miss queue 50, because the data may be available in data cache 46. If a line fetch is not in transit, the "NO" path is taken to step 64 and the DST request is allowed. If a DST line fetch is in transit, the "YES" path is taken to step 62 and the DST request is stalled. The method of FIG. 5 continues as long the data processing system is operating.

Figure 6:
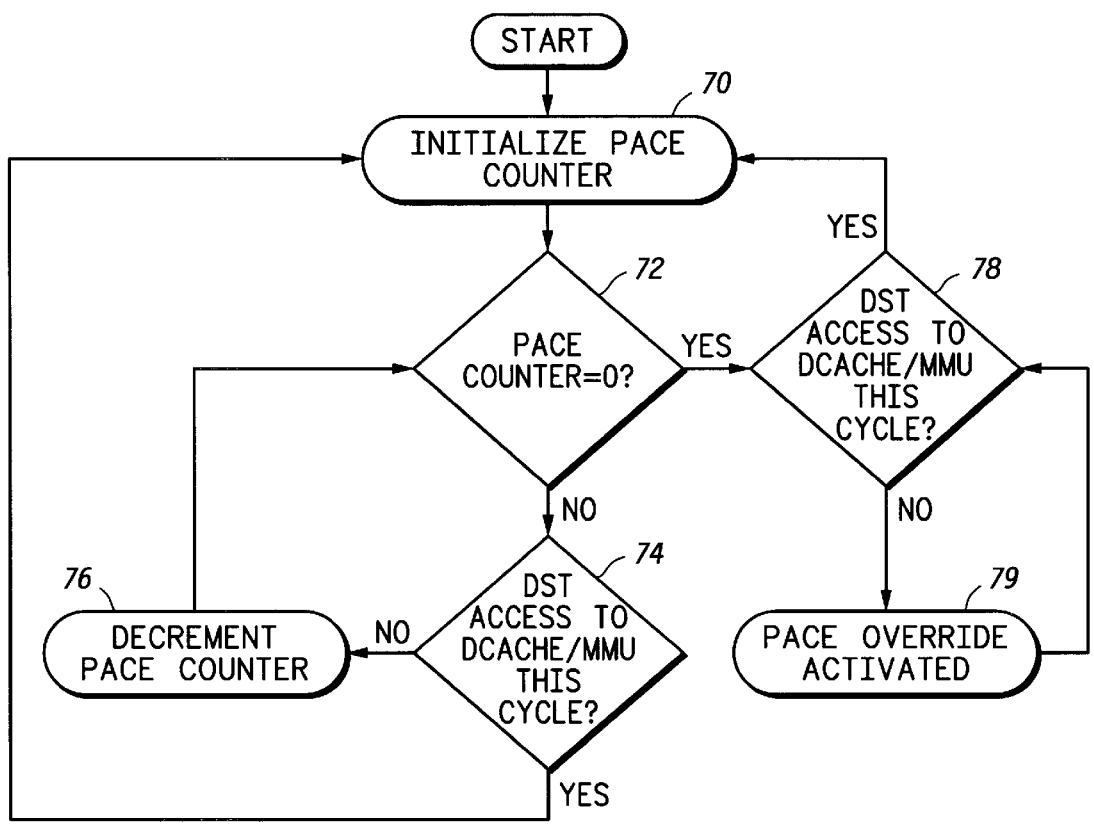
FIG. 6 illustrates a flow chart of a method for controlling access to the data cache of FIG. 4.

FIG. 6 illustrates a flow chart of the pace mechanism used to control DST controller 300 access to data cache and MMU 16. At step 70, the pace counter of DST controller 300 is initialized. The initial value provided to the pace counter determines how often DST controller 300 is going to be allowed to interrupt normal load/store access. At step 72, it is determined if the value in the pace counter is equal to a final value such as zero. If the value in the pace counter is equal to zero, the "YES" path is taken to decision step 78. At decision step 78, it is determined if there is a DST access to data cache and MMU 16 on this cycle. If yes, program flow returns to step 70 and the pace counter is again initialized. If the DST did not access data cache and MMU 16 on this cycle, then the "NO" path is taken to step 79. At step 79, the pace mechanism allows DST controller 300 to override normal load/store accesses to data cache and MMU 16 if the pace counter has counted down to zero. The override will remain active until a DST access to data cache and MMU 16 is successful.

If, at decision step 72, the value in the pace counter if not equal to zero, then the "NO" path is taken to decision step 74. At decision step 74, it is determined if there was a DST controller access to data cache and MMU 16 on this cycle. If not, then the "NO" path is taken to step 76 and the pace counter is decremented. Note that the pace counter counts to zero and will not decrement to a value less than zero. Program flow then returns back to decision step 72. If, however, a DST access was requested on this cycle then the "YES" path is taken back to step 70 causing the pace counter to be reinitialized.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the true scope of the invention.

What is claimed is:

1. A data processing system, comprising:
   instruction dispatch means for providing a plurality of instructions;
   an instruction execution unit for receiving at least one of the plurality of instructions from the instruction dispatch means;
   a data cache coupled to the instruction execution unit, the data cache receiving address information;
   a cache miss queue unit coupled to the data cache, the cache miss queue unit comprising a plurality of entries for storing information corresponding to cache misses, the cache miss queue unit fetching data for use in the data cache in response to a request from the data cache; and
   a data stream touch (DST) controller, the data stream touch controller receiving an available entry indicator from the cache miss queue unit, wherein if the available entry indicator is above a predetermined threshold value, the data stream touch controller providing a prefetch address to the data cache else the data stream touch controller withholding the prefetch address from the data cache.

2. The data processing system of claim 1, wherein the DST controller receives a data stream touch instruction from the instruction dispatch means, the data stream touch instruction activating the DST controller.

3. The data processing system of claim 2, wherein the DST controller receives a data stream touch stop instruction from the instruction dispatch means, the data stream touch instruction deactivating the DST controller.

4. The data processing system as in claim 2, wherein the instruction dispatch means provides the data stream touch instruction to the instruction execution unit, and in response, the instruction execution unit provides the data stream touch instruction to the DST controller.

5. The data processing system as in claim 1, wherein the available entry indicator is equal to a number of available entries in the cache miss queue unit.

6. The data processing system as in claim 1, wherein the DST controller determines a number of available entries in the cache miss queue unit based on the available entry indicator.

7. The data processing system as in claim 1, wherein the DST controller performs asynchronous data prefetching.

8. A method for processing instruction in a data processing system, the data processing system having a data cache, a cache miss queue unit, an asynchronous prefetching means, and an instruction execution unit, the asynchronous prefetching means prefetching data for use in the data cache, the method comprising the steps of:

determining a threshold value; and determining a first number of available entries in the cache miss queue unit;

the asynchronous prefetching means prefetching data for use in the data cache if the first number is above the threshold value else the asynchronous prefetching means stalling a next prefetch of data for use in the data cache.

9. The method of claim 8, wherein the threshold value indicates a number of available entries in the cache miss queue unit which prevents interruption of execution of instructions in the instruction execution unit.

10. The method of claim 8, wherein if the first number is equal to zero, the asynchronous prefetching means stalls the next prefetch of data for use in the data cache.

11. The method of claim 8, wherein if the first number is equal to the threshold value, the asynchronous prefetching means prefetching data for use in the data cache unless a prefetch request is in progress at the data cache and could result in a prefetch request to cache miss queue unit.

* * * * *